(12) United States Patent
Punithakumar et al.

(10) Patent No.: US 8,811,705 B2
(45) Date of Patent: Aug. 19, 2014

(54) METHODS, APPARATUS AND ARTICLES OF MANUFACTURE TO TRACK ENDOCARDIAL MOTION

(75) Inventors: Kumaradevan Punithakumar, London (CA); Shuo Li, London (CA); Ismail Ben Ayed, London (CA); Ian Ross, London (CA); Ali Islam, London (CA); Richard Rankin, London (CA)

(73) Assignees: General Electric Company, Schenectady, NY (US); London Health Sciences Centre Research Inc., London (CA)

( * ) Notice: Subject to any disclaimer, the term of this patent is extended or adjusted under 35 U.S.C. 154(b) by 1269 days.

(21) Appl. No.: 12/636,470

(22) Filed: Dec. 11, 2009

(65) Prior Publication Data

US 2011/0064290 A1 Mar. 17, 2011

Related U.S. Application Data

(60) Provisional application No. 61/242,215, filed on Sep. 14, 2009.

(51) Int. Cl.
*G06T 7/00* (2006.01)
*G06T 7/20* (2006.01)

(52) U.S. Cl.
CPC .................................. *G06T 7/208* (2013.01)
USPC ....................................................... 382/131

(58) Field of Classification Search
CPC ...... A61B 6/03; A61B 8/0883; A61B 5/1128; A61B 6/503; A61B 6/5217; A61B 6/5264; G06T 2207/30048; G06T 7/0081; G06T 7/0093; G06T 7/2006; G06T 7/2046; G06T 7/20; G06T 7/208; G06T 7/0087; G06T 7/602; G06K 2209/05; G06K 9/6207; G06K 9/4638; G06K 9/6224; G06K 9/6209; G06K 9/629; G06K 9/6296; G06F 19/345
USPC .................................................. 382/130–132
See application file for complete search history.

(56) References Cited

U.S. PATENT DOCUMENTS

| 5,111,820 A | 5/1992 | Axel et al. |
| 5,257,625 A | 11/1993 | Pelc |
| 5,602,891 A | 2/1997 | Pearlman |
| 5,923,770 A | 7/1999 | O'Donnell et al. |

(Continued)

OTHER PUBLICATIONS

Putra et al., A multiple model approach to respiratory motion prediction for real-time IGRT, Feb. 25, 2008, Physics in Medicine and Biology, vol. 53, pp. 1651-1663.*

(Continued)

*Primary Examiner* — Toan Ton
*Assistant Examiner* — John Corbett
(74) *Attorney, Agent, or Firm* — Hanley, Flight & Zimmerman, LLC

(57) ABSTRACT

Example methods, apparatus and articles of manufacture to track endocardial motion are disclosed. A disclosed example method includes segmenting a plurality of cardiac images of a left ventricle to form respective ones of a plurality of segmented images, updating a plurality of models based on the plurality of segmented images to form respective ones of a plurality of motion estimates for the left ventricle, computing a plurality of probabilities for respective ones of the plurality of models, and computing a weighted sum of the plurality of motion estimates based on the plurality of probabilities, the weighted sum representing a predicted motion of the left ventricle.

17 Claims, 5 Drawing Sheets

(56) References Cited

U.S. PATENT DOCUMENTS

| | | | |
|---|---|---|---|
| 6,031,374 | A | 2/2000 | Epstein et al. |
| 6,171,241 | B1 | 1/2001 | McVeigh et al. |
| 6,236,738 | B1 | 5/2001 | Zhu et al. |
| 6,292,683 | B1 | 9/2001 | Gupta et al. |
| 6,295,464 | B1 | 9/2001 | Metaxas |
| 6,453,187 | B1 | 9/2002 | Prince et al. |
| 6,724,938 | B1 | 4/2004 | Matsumura |
| 6,757,423 | B1 | 6/2004 | Amini |
| 6,892,089 | B1 | 5/2005 | Prince et al. |
| 6,980,682 | B1 | 12/2005 | Avinash et al. |
| 7,072,494 | B2 | 7/2006 | Georgescu et al. |
| 7,077,807 | B2 | 7/2006 | Torp et al. |
| 7,215,802 | B2 | 5/2007 | Klingensmith et al. |
| 7,233,818 | B1 | 6/2007 | Aletras et al. |
| 7,421,101 | B2 | 9/2008 | Georgescu et al. |
| 7,558,402 | B2 | 7/2009 | Zhou et al. |
| 2005/0238215 | A1 | 10/2005 | Jolly et al. |
| 2005/0238233 | A1 | 10/2005 | Mulet Parada et al. |
| 2006/0122512 | A1 | 6/2006 | Abe |
| 2007/0014473 | A1 | 1/2007 | Slabaugh et al. |
| 2007/0016000 | A1 | 1/2007 | Prince et al. |
| 2008/0298682 | A1 | 12/2008 | Cocosco et al. |
| 2009/0131791 | A1 | 5/2009 | Clark |

OTHER PUBLICATIONS

Action et al., Biomedical Image Analysis: Tracking, 2005, Morgan & Claypool Publishers, ISBN: 1-598290-5.*

Helmick et al, Fixed-Interval Smoothing for Markovian Switching Systems, 1995, IEEE, vol. 41, pp. 1845-1855.*

Mansor et al., Local Wall Motion Classification of Stress Echocardiography Using a Hidden Markov Model Approach, May 2008, IEEE, pp. 1295-1298.*

Spottiswoode et al., Motion-guided Segmentation of the Left Ventricle for Cine DENSE MRI, 2006, Proceedings of the International Society for Magnetic Resonance in Medicine, vol. 14, p. 794.*

* cited by examiner

12

METHODS, APPARATUS AND ARTICLES OF MANUFACTURE TO TRACK ENDOCARDIAL MOTION

RELATED APPLICATION

This patents claims benefit from U.S. Provisional Patent Application Ser. No. 61/242,215, entitled "Methods, Apparatus and Articles of Manufacture to Detect Heart Motion Abnormalities," and filed Sep. 14, 2009, which is hereby incorporated by reference in its entirety.

FIELD OF THE DISCLOSURE

This disclosure relates generally to endocardial motion and, more particularly, to methods, apparatus and articles of manufacture to track endocardial motion.

BACKGROUND

A widely used cardiac diagnostic technique involves the imaging of different portions of a heart during various phases of a heartbeat or cardiac cycle to track endocardial motion, and/or to detect or diagnose cardiac disease, abnormalities and/or damage. Example cardiac imaging tools are a magnetic resonance imaging (MRI) system and a computed topography (CT) imaging system.

BRIEF DESCRIPTION OF THE INVENTION

In view of the following descriptions and figures, it should be clear that the present disclosure describes methods, apparatus and articles of manufacture to track endocardial motion. Coronary heart disease is the most common type of cardiovascular disease, and early detection of heart motion abnormality(-ies) may be used to diagnose and/or control heart disease. Accordingly, tracking and/or predicting heart wall motion can be extremely useful in the clinical environment. However, due to the vast amount of information and the uncertainties associated with heart motion, tracking and/or identifying heart motion abnormalities can be difficult via visual inspection of cardiac images.

The example methods, apparatus and articles of manufacture disclosed herein provide certain advantages over existing heart motion tracking methods. For example, the subjective evaluation of heart images by a radiologist can be reduced and/or eliminated, thereby reducing inter and/or intra-observer variability. The examples disclosed herein also enable automated analysis, which can reduce the time required to obtain a diagnosis and/or begin treatment.

As disclosed herein, endocardial motion may be tracked by processing a sequence of cardiac images. The cardiac images may be segmented into one or more regions using a graph cut distribution process, which determines an initial segmentation of the left ventricle (LV) cavity within each frame to maintain a substantially consistent photometric and/or geometric distribution of the LV cavity over the sequence of cardiac images. The segmented images may then be processed or filtered using multiple models for temporal consistency. A Markovian switching system, such an interacting multiple model (IMM) estimator, that has both continuous (noise) and discrete (model) uncertainties may be used to process the segmented images. Outputs of the multiple models may be combined based on respective probabilities of correct motion estimation to form an estimate and/or prediction of endocardial motion. One or more outputs of the IMM estimator may be processed to detect and/or identify heart motion abnormalities. In some examples, a forward IMM estimator and a backward IMM estimator may be computed and combined to form an estimate and/or prediction of endocardial motion.

According to certain aspects of this disclosure, an example method includes segmenting a plurality of cardiac images of a left ventricle to form respective ones of a plurality of segmented images, updating a plurality of models based on the plurality of segmented images to form respective ones of a plurality of motion estimates for the left ventricle, computing a plurality of probabilities for respective ones of the plurality of models, and computing a weighted sum of the plurality of motion estimates based on the plurality of probabilities, the weighted sum representing a predicted motion of the left ventricle.

According to further aspects of this disclosure, an example apparatus includes a segmenter to segment a plurality of cardiac images of a left ventricle to form respective ones of a plurality of segmented images, a Kalman filter to update a plurality of models based on the plurality of segmented images to form respective ones of a plurality of motion estimates for the left ventricle, an IMM estimator to compute a plurality of probabilities for respective ones of the plurality of models, and a motion tracker compute a weighted sum of the plurality of motion estimates based on the plurality of probabilities, the weighted sum representing a predicted motion of the left ventricle.

DETAILED DESCRIPTION

In the interest of brevity and clarity, throughout the following disclosure references will be made to an example diagnostic imaging workstation 105. However, the methods, apparatus and articles of manufacture described herein to track or predict endocardial motion may be implemented by and/or within any number and/or type(s) of additional and/or alternative diagnostic imaging systems. For example, the methods, apparatus and articles of manufacture described herein could be implemented by or within a device and/or system that captures diagnostic images (e.g., a computed tomography (CT) imaging system and/or a magnetic resonance imaging (MRI) system), and/or by or within a system and/or workstation designed for use in viewing, analyzing, storing and/or archiving diagnostic images (e.g., the GE® picture archiving and communication system (PACS), and/or the GE advanced workstation (AW)). Moreover, the example methods, apparatus and articles of manufacture disclosed herein may be used to process any number and/or type(s) of other images, including other types of cardiac images, to track motion.

Figure 1:
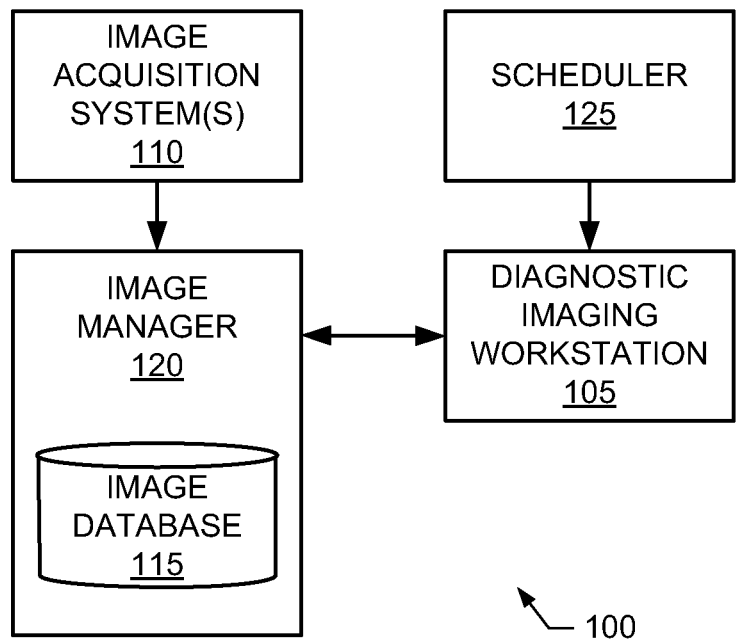
FIG. 1 is a schematic illustration of an example diagnostic imaging system within which the example methods, apparatus and articles of manufacture described herein may be implemented.

FIG. 1 illustrates an example diagnostic imaging system 100 including the example diagnostic imaging workstation 105 to process cardiac left-ventricle images to track endocardial motion. The cardiac left-ventricle images may be captured by any number and/or type(s) of image acquisition system(s) 110, and stored in any number and/or type(s) of image database(s) 115 managed by any number and/or type(s) of image manager(s) 120. The processing of cardiac left-ventricle images by the example diagnostic imaging workstation 105 may be scheduled by any number and/or type(s) of scheduler(s) 125. Example image acquisition systems 110 include, but are not limited to, a CT imaging system and/or an MRI system. Images may be stored and/or archived in the example image 115 of FIG. 1 using any number and/or type(s) of data structures, and the example image database 115 may be implemented using any number and/or type(s) of memory(-ies), memory device(s) and/or storage device(s) such as a hard disk drive, a compact disc (CD), a digital versatile disc (DVD), a floppy drive, etc.

Figure 2:
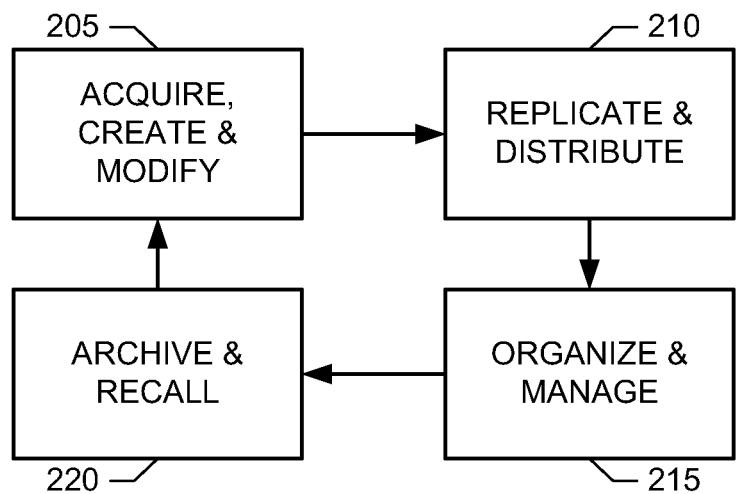
FIG. 2 illustrates an example image lifecycle management flow within which the example methods, apparatus and articles of manufacture described herein may be implemented.

FIG. 2 illustrates an example image lifecycle management flow 200 that may be implemented by the example diagnostic imaging system 100 of FIG. 1. Images (e.g., left-ventricle images) are acquired, created and/or modified by the image acquisition system(s) 110 (block 205). The example image manager(s) 120 replicate, distribute, organize and/or otherwise manage the captured images (block 210). The example diagnostic imaging workstation 105 of FIG. 1 processes a sequence of replicated, distributed, organized and/or otherwise managed images to, among other things, track endocardial motion (block 215). Information created, computed and/or otherwise determined during the tracking, estimation and/or prediction of endocardial motion by the diagnostic imaging workstation 105 can be used to reduce the number of image(s) and/or the amount of data that must be stored, archived and/or otherwise maintained for future recall (block 220).

Figure 3:
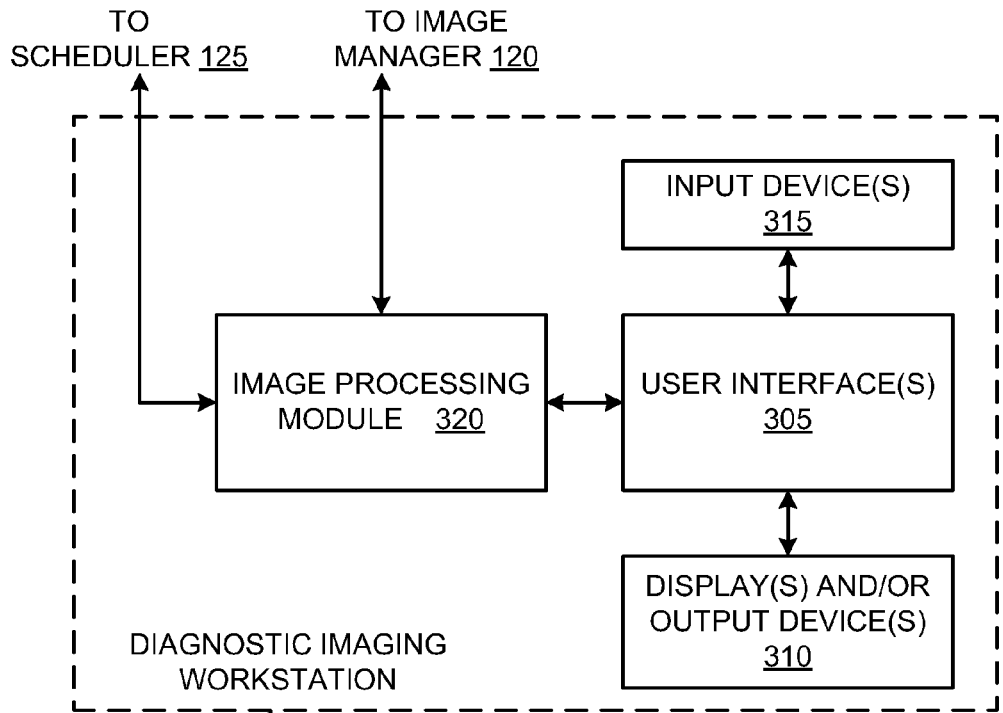
FIG. 3 illustrates an example manner of implementing the example diagnostic workstation of FIG. 1.

FIG. 3 illustrates an example manner of implementing the example diagnostic imaging workstation 105 of FIG. 1. The example diagnostic imaging workstation 105 of FIG. 3 may implement any or all of the example methods, apparatus and articles of manufacture disclosed herein to track endocardial motion. To allow a user (not shown) to interact with the example diagnostic imaging workstation 105, the diagnostic imaging workstation 105 of FIG. 3 includes any number and/or type(s) of user interface module(s) 305, any number and/or type(s) of display(s) and/or output device(s) 310 and any number and/or type(s) of input device(s) 315. The example user interface module(s) 305 of FIG. 3 implements an operating system to present information (e.g., images, windows, screens, interfaces, dialog boxes, etc.) at the display(s) and/or output device(s) 310, and to allow a user to control, configure and/or operate the example diagnostic imaging workstation 105 via the input device(s) 315. The user provides and/or makes inputs and/or selections to the user interface module 305 and/or, more generally, to the example diagnostic imaging workstation 105 via the input device(s) 315. Example input devices 315 include, but are not limited to, a keyboard, a touch screen, a trackball and/or a mouse. In an example, a patient search window is presented at the display 310, and the input device(s) 315 are used to enter search criteria to identify a particular patient. When a patient is identified and selected, the example user interface 305 presents a list of available diagnostic images for the patient at the display 310, and the user selects one or more diagnostic images and/or sequences of diagnostic images using the input device(s) 315. An image-processing module 320 obtains the selected image sequence(s) from the example image manager 120, processes the selected image sequence(s) to track endocardial motion, and presents information related to the tracked, estimated and/or predicted endocardial motion and/or identified probable heart motion abnormalities at the display 310 for viewing by the user. Such information may be used in the diagnosis of the selected patient. An example manner of implementing the example image processing module 320 of FIG. 3 is described below in connection with FIG. 4. Example processes that may be carried out to implement the example image processing module 320 and/or, more generally, the example diagnostic imaging workstation 105 are described below in connection with FIGS. 5-7.

While an example manner of implementing the example diagnostic imaging workstation 105 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. For example, the example user interface(s) 305, the example display(s) and/or output device(s) 310, the example input device(s) 315, the example image processing module 320 and/or, more generally, the example diagnostic imaging workstation 105 of FIG. 3 may be implemented by hardware, software, firmware and/or any combination of hardware, software and/or firmware. Thus, for example, any of the example user interface(s) 305, the example display(s) and/or output device(s) 310, the example input device(s) 315, the example image processing module 320 and/or, more generally, the example diagnostic imaging workstation 105 may be implemented by one or more circuit(s), programmable processor(s), application specific integrated circuit(s) (ASIC(s)), programmable logic device(s) (PLD(s)) and/or field programmable logic device(s) (FPLD(s)), etc. When any apparatus claim of any patent resulting from this application is read to cover a purely software and/or firmware implementation, at least one of the example user interface(s) 305, the example display(s) and/or output device(s) 310, the example input device(s) 315, the example image processing module 320 and/or, more generally, the example diagnostic imaging workstation 105 are hereby expressly defined to include a tangible computer-readable medium such as a memory, a DVD, a CD, etc. storing the firmware and/or software. Further still, the example diagnostic imaging workstation 105 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
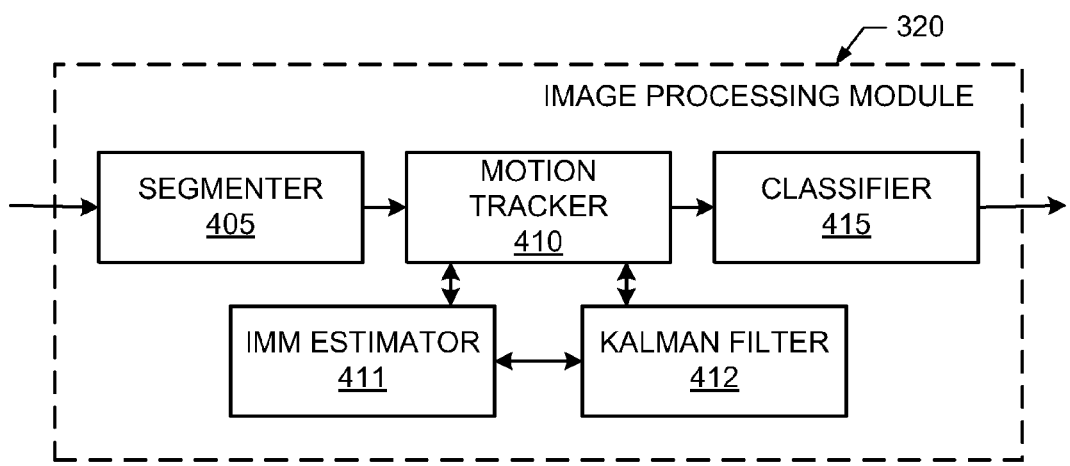
FIG. 4 illustrates an example manner of implementing the example image processing module of FIG. 3.

FIG. 4 illustrates an example manner of implementing the example image processing module 320 of FIG. 3. To segment selected image sequence(s), the example image processing module 320 of FIG. 4 includes a segmenter 405. Using any number and/or type(s) of method(s) and/or algorithm(s), the example segmenter 405 of FIG. 4 processes selected images and/or image sequences to detect, identify, determine and/or estimate the boundary of the left-ventricle heart cavity in each selected image. In other words, the example segmenter 405 processes the selected images to identify the endocardium in each of the selected images.

The segmentation of the LV within any particular cardiac image may be difficult due to low contrast and/or photometric similarities between connected cardiac regions. The example segmenter 405 of FIG. 4 implements a graph cut distribution method, algorithm and/or process to determine an initial LV cavity segmentation for each selected cardiac image frame. The graph cut distribution method implemented by the example segmenter 405 substantially maintains the photometric and/or geometric distributions of the LV cavity over a sequence of cardiac images.

Letting $I_p^n = I^n(p): P \subset \mathbb{R}^2 \to I$, $n \in [1 \ldots N]$ represent a cardiac image sequence, with N being the number of frames in the sequence, P represent the positional array, and I represent the space of photometric variables, the example segmenter 405 of FIG. 4 partitions P for each frame $n \in [2 \ldots N]$ into two regions: the heart cavity and the its complement in P. The example segmenter 405 partitions P by minimizing a discrete cost function with respect to a binary variable or labeling $L^n(p): P \to \{0,1\}$, which represents the partitioning of P. P is partitioned into a heart cavity $C^n$ corresponding to region $\{p \in P / L^n(p)=1\}$ and its complement, the background $B^n$ corresponding to region $\{p \in P / L^n(p)=0\}$. An example cost function includes an intensity or photometric matching term and a distance or geometric matching term. For any particular labeling L: P→{0,1}, any particular image I: $P \subset \mathbb{R}^2 \to I$, and any space of variables I, example matching terms can be defined based on a kernel density estimate (KDE) and a Bhattacharyya coefficient.

An example KDE $P_{L,I}^I$, which represents the distribution of image data I within region $R_L = \{p \in P / L(p) = 1\}$, can be expressed mathematically as $$\forall i \in I, \quad P_{L,I}^I(i) = \frac{\sum_{p \in R_L} K(i - I_p)}{A_L}, \text{ where} \quad (1)$$

$$K(y) = \frac{1}{\sqrt{2\pi\sigma^2}} \exp^{-\frac{y^2}{2\sigma^2}} \quad (2)$$

$A_L$ represents the number of pixels within the region $R_L$ defined by $A_L = \Sigma_{R_L} 1.$, and σ represents the width of the Gaussian kernel.

An example Bhattacharyya coefficient B(f,g), which represents the amount of overlap (similarity) between two distributions f and g, can be expressed mathematically as $$B(f,g) = \Sigma_{i \in I} \sqrt{f(i)g(i)}. \quad (3)$$

In some examples a segmentation of an initial or learning frame $I^1$ (i.e., a labeling $L^1$ defining a partition $\{C^1, B^1\}$) is provided by a user of the example diagnostic imaging workstation 105. Starting with the segmentation of the initial frame $I^1$, the example segmenter 405 of FIG. 4 computes and/or adjusts photometric and geometric model distributions and/or constraints to segment subsequent frames $I^n$, $n \in [2 \ldots N]$.

An example photometric constraint may be computed as follows. Starting from an intensity model $M^I = P_{L^1,I^1}^I$ learned for a previous frame, the example segmenter 405 of FIG. 4 finds for each subsequent frame $I^n$ a region $C^n$ whose intensity distribution most closely matches $M^I$. The example segmenter 405 identifies the region $C^n$ by minimizing the following intensity matching function with respect to L $$B^I(L,I^n) = -B(P_{L,I^n}^I, M^I) = -\Sigma_{i \in I} \sqrt{P_{L,I^n}^I(i) M^I(i)}. \quad (4)$$

An example geometric constraint, which constrains the segmentation based on prior geometric information (shape, scale, and position of the cavity) obtained from a previously segmented image, can be computed as follows. Let c represent the centroid of cavity $C^1$ in the initial or learning frame $I^1$, and let $$D(p) = \frac{\|p - c\|}{N_D} : P \to D$$

represent a distance image measurement or metric at each point $p \in P$ representing the normalized distance between p and c, where D represents the space of distance variables and $N_D$ comprises a normalization constant. Letting $M^D = P_{L^1,D}^D$ represent the model distribution of distances within the cavity $C^1$ in the learning frame $I^1$, the example segmenter 405 of FIG. 4 identifies the region $C^n$ whose distance distribution most closely matches $M^D$. The region $C^n$ may be identified by minimizing the following mathematical expression $$B^D(L,D) = -B(P_{L,D}^D, M^D) = -\Sigma_{d \in D} \sqrt{P_{L,D}^D(d) M^D(d)}. \quad (5)$$

An example segmentation cost function includes the example photometric and geometric matching terms described above as well as a smoothness term. For each $n \in [2 \ldots N]$, example segmenter 405 of FIG. 4 computes a labeling $L_{opt}^n$ by minimizing the following mathematical expression $$F(L,I^n) = B^I(L,I^n) + B^D(L,D) + \lambda S(L), \quad (6)$$

where S(L) represents the length of the partition boundary, which can be expressed as $$S(L) = \sum_{\{p,q\} \in N} \frac{1}{\|p - q\|} \delta_{L_p \neq L_q}, \text{ with } \delta_{x \neq y} = \begin{cases} 1 \text{ if } x \neq y \\ 0 \text{ if } x = y. \end{cases} \quad (7)$$

In EQN (7), N represents a neighborhood system representing all unordered pairs {p,q} of neighboring elements of P, and λ comprises a positive constant that balances the relative contribution of S. In general, optimization of the distribution matching terms F(L,$I^n$) in EQN (6) is NP-hard and does not afford an analytical form amenable to graph cut optimization. Furthermore, gradient-based optimization procedures are computationally very expensive and may be difficult to apply.

To overcome at least these problems, the example segmenter 405 of FIG. 4 computes a first-order approximation of the example Bhattacharyya measure in F(L,$I^n$) of EQN (6) by introducing an auxiliary labeling that corresponds to an arbitrary fixed partition. For any labeling L, the intensity matching term minus a constant can be expressed as:

$$B^I(L, I^n) - \underbrace{B^I(L^a, I^n)}_{Constant} \approx \underbrace{\sum_{p \in P} \delta B_{p,L^a,L}^I}_{Variations \text{ of } B^I} = \quad (9)$$

$$-\frac{1}{2} \sum_{p \in P} \sum_{i \in I} \sqrt{\frac{M^I(i)}{P_{L^a,I^n}^I(i)}} \delta P_{p,L^a,L}^I(i),$$

where $\delta B_{p,L^a,L}^I$ and $\delta P_{p,L^a,L}^I(i)$ represent elementary variations of, respectively, $B^I(L^a,I^n)$ and $P_{L^a,I^n}^I(i)$, and each correspond to changing the label of pixel p from $L^a(p)$ to L(p). The example segmenter 405 computes the elementary variation $\delta B_{p,L^a,L}^I$ in the rightmost equality of EQN (9) using the first-order expansion of the Bhattacharyya measure $B^I(L,I^n)$. The segmenter 405 computes the elementary $\delta P_{p,L^a,L}^I(i)$ i∈I using the kernel density estimate in EQN (1), which after some mathematical manipulations can be expressed as $$\delta P^I_{p,L^a,L}(i) = \begin{cases} \delta_{L^a(p)\neq 1} \dfrac{K(i-I^n_p) - P^I_{L^a,I^n}(i)}{A_{L^a+1}} & \text{if } L(p)=1 \\ \delta_{L^a(p)\neq 0} \dfrac{P^I_{L^a,I^n}(i) - K(i-I^n_p)}{A_{L^a-1}} & \text{if } L(p)=0, \end{cases} \quad (10)$$

$$\delta P^I_{p,L^a,L}(i) = \begin{cases} \delta_{L^a(p)\neq 1} \dfrac{K(i-I^n_p) - P^I_{L^a,I^n}(i)}{A_{L^a+1}} & \text{if } L(p)=1 \\ \delta_{L^a(p)\neq 0} \dfrac{P^I_{L^a,I^n}(i) - K(i-I^n_p)}{A_{L^a-1}} & \text{if } L(p)=0 \end{cases}$$

where $\delta_{x\neq y}$ is given by EQN (8). Substituting EQN (10) in EQN (9) and after some mathematical manipulations, the intensity matching term can be approximated as the sum of unary penalties plus a constant, which can be expressed mathematically as $$B^I(L,I^n) \approx \text{constant} + \Sigma_{p\in P} b^I_{p,I^n}(L(p)), \quad (11)$$

where $b^I_{p,I}$ may be defined, for any image I: $P \subset \mathbb{R}^2 \to I$ and any space of variables I, by $$b^I_{p,I}(1) = \frac{\delta_{L^a(p)\neq 1}}{2(A_{L^a+1})}\left(B^I(L^a, I) - \sum_{i\in I} K(i-I_p)\sqrt{\frac{M^I(i)}{P^I_{L^a,I}(i)}}\right) \quad (12)$$

$$b^I_{p,I}(0) = \frac{\delta_{L^a_p\neq 0}}{2(A_{L^a+1})}\left(\sum_{i\in I} K(i-I_p)\sqrt{\frac{M^I(i)}{P^I_{L^a,I}(i),}} - B^I(L^a, I)\right).$$

Applying substantially similar mathematical manipulations to the example distance matching term including utilizing the example notations of EQN (12) to the distance image D, and ignoring constants, the example optimization problem expressed in EQN (7) can be approximated by the following sum of unary and pairwise (submodular) penalties $$L^{opt} = \arg\min_{L:P\to\{0,1\}} \sum_{p\in P} \{b^I_{p,I^n}(L(p)) + b^D_{p,D}(L(p))\} + \lambda S(L). \quad (13)$$

In combinatorial optimization, a global optimum of the sum of unary and pairwise (submodular) penalties can be computed efficiently in low-order polynomial time by solving a mathematically equivalent max-flow problem. The example segmenter 405 of FIG. 4 defines a weighted graph $\mathcal{G} = \langle N,E\rangle$, where N represents the set of nodes and E represents the set of edges connecting these nodes. N includes a node for each pixel p∈P and two additional terminal nodes, one representing the foreground region (i.e., the cavity) denoted $T_F$, and the other representing the background denoted $T_B$. Let $w_{p,q}$ represent the weight of the edge connecting neighboring pixels {p,q} in N, and $\{w_{p,T_F}, w_{p,T_B}\}$ represent the weights of the edges connecting each pixel p to each of the terminals. Example edge weights can be expressed as $$w_{p,T_F} = b^I_{p,I^n}(0) + b^D_{p,D}(0); \quad (14)$$

$$w_{p,T_B} = b^I_{p,I^n}(1) + b^D_{p,D}(1);$$

$$w_{p,q} = \frac{\lambda}{\|p-q\|}.$$

The example segmenter 405 of FIG. 4 selects a minimum cut $C^n_{opt}$ of graph $\mathcal{G}$, i.e., a subset of the edges in E whose removal divides the graph $\mathcal{G}$ into two disconnected subgraphs, each containing a terminal node, and whose sum of edge weights is minimal. The example segmenter 405 selects the minimum cut $C^n_{opt}$ using the max-flow algorithm described by Boykov and Kolmogorov in a paper entitled "An experimental comparison of min-cut/max-flow algorithms for energy minimization in vision," which was published in *IEEE Transactions on Pattern Analysis and Machine Intelligence* 26(9):1124-1137, 2004, and which is hereby incorporated by reference in its entirety. This minimum cut $C^n_{opt}$ of graph $\mathcal{G}$, which assigns each node (pixel) p in P to one of the two terminals, results in a labeling $L^n_{opt}$ ($L^n_{opt}(p)=1$ if p is connected to $T_F$ and $L^n_{opt}(p)=0$ if p is connected to $T_B$) that substantially and/or globally minimizes the example approximation of EQN (13).

Additional and/or alternative methods and apparatus that may be implemented by the example segmenter 405 to segment images are described in U.S. patent application Ser. No. 12/325,226, which was filed on Nov. 30, 2008, and which is hereby incorporated by reference in its entirety.

Let (x,y) represent a Cartesian point on the boundary between the segmentation regions identified and/or determined by the example segmenter 405. Let $\xi$ represent an example state vector $\xi=[\bar{x}\ x\ \dot{x}]^T$ that represents the dynamics of a point in the x-coordinate direction, where $\dot{x}$ and $\bar{x}$ denote, respectively, velocity and the mean position over a cardiac cycle or heartbeat. Assuming motion of the heart is substantially periodic, an example continuous state-space model that describes the cyclic motion of the point can be expressed as $$\dot{\xi}(t) = \begin{bmatrix} 0 & 0 & 0 \\ 0 & 0 & 1 \\ \omega^2 & -\omega^2 & 0 \end{bmatrix}\xi(t) + \begin{bmatrix} 1 & 0 \\ 0 & 0 \\ 0 & 1 \end{bmatrix} w(t) = A(\omega)\xi(t) + Bw(t), \quad (15)$$

where ω is the angular frequency, and w(t) is white noise that represents the unpredictable modeling errors arising in heart motion tracking, estimation and/or prediction. The example mathematical model of EQN (15) is linear for a given ω, and is an approximation of a temporal periodic model where higher-order terms of the Fourier expansion are neglected. A substantially equivalent discrete-time version of EQN (15) can be expressed as $$\xi_{k+1} = \begin{bmatrix} 1 & 0 & 0 \\ 1-\cos(\omega T) & \cos(\omega T) & \frac{1}{\omega}\sin(\omega T) \\ \omega\sin(\omega T) & -\omega\sin(\omega T) & \cos(\omega T) \end{bmatrix}\xi_k + w_k = F(\omega)\xi_k + w_k, \quad (16)$$

where $w_k$ represents a discrete-time white noise sequence and T represents the sampling interval. The covariance of process noise $Q_k = \text{cov}(w_k)$ is given by $$Q_k = [q_{ij}]_{3\times 3}, \quad (17)$$

where the $q_{ij}$'s are defined to be $$q_{11} = q_1^2 T \tag{18}$$

$$q_{12} = q_{21} = \frac{q_1^2(\omega T - \sin(\omega T))}{\omega} \tag{19}$$

$$q_{13} = q_{31} = q_1^2(1 - \cos(\omega T)) \tag{20}$$

$$q_{22} = \frac{1}{2} \frac{q_1^2\omega^2 \begin{pmatrix} 3\omega T - 4\sin(\omega T) + \\ \cos(\omega T)\sin(\omega T) \end{pmatrix} + q_2^2 \begin{pmatrix} \omega T - \\ \cos(\omega T)\sin(\omega T) \end{pmatrix}}{\omega^3} \tag{21}$$

$$q_{23} = q_{32} = \frac{1}{2} \frac{q_1^2\omega^2(1 - 2\cos(\omega T) + \cos^2(\omega T)) + q_2^2\sin^2(\omega T)}{\omega^2} \tag{22}$$

$$q_{33} = -\frac{1}{2} \frac{q_1^2\omega^2(\cos(\omega T)\sin(\omega T) - \omega T) - q_2^2(\cos(\omega T)\sin(\omega T) - \omega T)}{\omega}. \tag{23}$$

Letting s represent an example state vector $s=[\bar{x}\ x\ \dot{x}\ \bar{y}\ y\ \dot{y}]^T$, which represents the dynamics of the left-ventricle cavity in the x-y plane, an example discrete state-space model for the motion of the endocarium in the x-y plane is given by $$s_{k+1} = \begin{bmatrix} F(\omega) & 0_{3\times3} \\ 0_{3\times3} & F(\omega) \end{bmatrix} s_k + v_k = F_k s_k + v_k. \tag{24}$$

The example single Markovian model of EQN (24) may be insufficient to accurately describe endocardial dynamics and/or motion because the angular frequency that characterizes the motion of a point on the endocardium for normal subjects changes over time, the dynamics of endocardial motion differ significantly in systolic and diastolic phases of the heart beat, and/or the endocardial dynamics of abnormal subjects differ significantly from those of normal subjects. Endocardial dynamics can be better represented by a hybrid system, which has both continuous (noise) and discrete (model) uncertainties. Such hybrid systems may be modeled using an IMM estimator.

To predict and/or model the future position and/or movement of left ventricular cavity points, the example image processing module 320 of FIG. 4 includes a motion tracker 410. The example motion tracker 410 of FIG. 4 constrains the LV cavity segmentations identified by the example segmenter 405 for temporal consistency. The example motion tracker 410 implements a Markovian switching system, such an IMM estimator 411, that has both continuous (noise) and discrete (model) uncertainties and may be used to process the segmented images to develop a plurality of models of endocardial motion, which may be used and/or combined to compute, predict and/or estimation endocardial motion.

Let $M=\{M^1, \ldots, M^n\}$ represent an example system that includes n discrete models. Let $\mu_0^j=P\{M_0^j\}$ represent the prior probability of model $M^j$, and $p_{ij}=P\{M_k^j|M_{k-1}^i\}$ represent the probability of switching from model from i to model j, with $M_k^j$ representing the model $M^j$ at time k. Example mathematical expressions for the model $M_k^j$ are given by $$s_k = F_k^j s_{k-1} + v_{k-1}^j \text{ and} \tag{25}$$

$$z_k = H_k^j s_k + \eta_k^j \text{ where} \tag{26}$$

$$H_k^j = \begin{bmatrix} B_k & 0_{3\times3} \\ 0_{3\times3} & B_k \end{bmatrix}, \tag{27}$$

$$B_k = [0\ 1\ 0], \tag{28}$$

$\eta_k^j$ represents a zero-mean Gaussian noise sequence with covariance $R_k^j$, and $F_k^j$ is defined above in connection with EQN (16).

The example IMM estimator 411 of FIG. 4 computes mixing probabilities for each model, and an example Kalman filter 412 update state and/or modeling equations for each model, and the example motion tracker 410 combines outputs of the updated models to form a prediction and/or estimate of endocardial motion. The example IMM estimator 411 of FIG. 4 computes the mixing probabilities $\mu_k^{i|j}$ for each model $M^i$ and $M^j$ using the following mathematical expressions $$\bar{c}_j = \sum_{i=1}^{n} p_{ij}\mu_{k-1}^i \text{ and} \tag{29}$$

$$\mu_k^{i|j} = \frac{1}{\bar{c}_j} \sum_{i=1}^{n} p_{ij}\mu_{k-1}^i. \tag{30}$$

where $\mu_{k-1}^i$ represents the model probability at k−1. The example IMM estimator 411 computes the inputs (mean and covariance) of each filter using the following mathematical expressions $$m_{k-1}^{0j} = \sum_{i=1}^{n} \mu_k^{i|j} m_{k-1}^i \tag{31}$$

and $$P_{k-1}^{0j} = \sum_{i=1}^{n} \mu_k^{i|j} \left[ P_{k-1}^i + (m_{k-1}^i - m_{k-1}^{0j})(m_{k-1}^i - m_{k-1}^{0j})^T \right]. \tag{32}$$

The example Kalman filter 412 of FIG. 4 updates the mode-conditioned state estimates for each model. Example predictions and updates are expressed by the following mathematical expressions $$[m_k^{-i}, P_k^{-i}] = KF_p(m_{k-1}^{0j}, P_{k-1}^{0j}, F(\omega^i), Q_k^i)$$

$$[m_k^i, P_k^i] = KF_u(m_k^{-i}, P_k^{-i}, z_k, H_k^i, R_k^i) \tag{33}$$

where $KF_p$ and $KF_u$ denote prediction and update equations of the Kalman filter 412, respectively.

The example motion tracker 410 of FIG. 4 computes the probability of the model $M_k^j$ being correct (i.e., its mode probability) as a function of the likelihoods of the other models $$\mu_k^i = \frac{\Lambda_k^i \bar{c}_i}{\sum_{i=1}^{n} \Lambda_k^i \bar{c}_i}, \tag{34}$$

where the likelihood of model $M^i$ is given by $$\Lambda_k^i = \mathcal{N}(v_k^i; 0, S_k^i), \tag{35}$$

where $v_k^i$ represents the measurement residual, and where $S_k^i$ represents the innovation covariance for model $M^i$ in the Kalman filter update.

The example motion tracker 410 of FIG. 4 computes an estimate of the LV boundary location and/or endocardial motion at each time k by combining the individual mode-conditioned filter estimates $m_k^i$ using the computed mode probabilities $\mu_k^i$. An example LV boundary motion prediction is expressed mathematically as $$m_k = \sum_{i=1}^{n} \mu_k^i m_k^i \quad (36)$$

and $$P_k = \sum_{i=1}^{n} \mu_k^i [P_k^i + (m_k^i - m_k)(m_k^i - m_k)^T]. \quad (37)$$

Because multiple cardiac images is available before processing begins, the performance of the modeling methods described above may be improved via smoothing. While the example motion tracker 410 of FIG. 4 may implement and/or apply any number and/or type(s) of smoothing algorithms, an example smoothing algorithm comprises fixed-interval smoothing. An example fixed-interval smoothing algorithm fuses the posterior distributions obtained from two IMM estimators 411, one running forward and the other backward using an equivalent reverse-time Markov model. However, obtaining the equivalent reverse-time model and the optimal forward/backward IMM estimators may be difficult. To overcome at least these difficulties, the example IMM estimator 411 of FIG. 4 approximates the backward IMM algorithm directly from the original Markov switching system with white Gaussian noise as described below.

Using total probability theory, an example backward filtering density $P(s_k|z_{k:N})$ can be expressed as $$P(s_k|z_{k:N}) = \sum_{j=1}^{n} \mu_k^{b,j} p(s_k^j|z_{k:N}), \quad (38)$$

where $\mu_k^{b,j}$ represents the model probability of the backward-time filter $M_k^j$. For the last image N, the forward and backward-time filters' model probabilities are the same, that is, $\mu_N^{b,j} = \mu_N^j$. Example model-conditioned backward-filtering densities can be expressed as $$p(s_k^j|Z_{k:N}) = \frac{1}{c} p(z_{k:N}|s_k^j) p(s_k^j|z_{k+1:N}), \quad (39)$$

where c comprises a normalizing constant. An example model-conditioned density $p(s_k^j|z_{k+1:N})$ given the future measurements $z_{k+1:N}$ is expressed as $$p(s_k^j|z_{k+1:N}) = \sum_{j=1}^{n} \mu_{k+1}^{b,i|j} p(s_k^j|M_{k+1}^j, z_{k+1:N}), \quad (40)$$

where the conditional mode probability $\mu_{k+1}^{b,i|j}$ may be computed as $$\mu_{k+1}^{b,i|j} = P\{M_{k+1}^i | M_k^j, z_{k+1:N}\} = \frac{1}{a_j} p_{ij}^{b,k} \mu_{k+1}^{b,i}. \quad (41)$$

An example normalization constant $a_j$ is given by $$a_j = \Sigma p_{ij}^{b,k} \mu_{k+1}^{b,i} \quad (42)$$

An example density $p(s_k^j|M_{k+1}^j, z_{k+1:N})$ may be approximated with a Gaussian distribution, where the mean and covariance are given by the Kalman filter prediction using the inverse of the state transition matrix, which can be expressed mathematically as $$[\hat{m}_k^{b,i}, \hat{P}_k^{b,i}] = KF_p(m_{k+1}^{b,i}, P_{k+1}^{b,i}, F(\omega^i)^{-1}, Q_k^i). \quad (43)$$

The example density $p(s_k^j|z_{k+1:N})$ can be approximated by a Gaussian distribution $$p(s_k^j|z_{k+1:N}) = \mathcal{N}(s_k^j|\hat{m}_k^{b,0j}, \hat{P}_k^{b,0j}) \quad (44)$$

where $$\hat{m}_k^{b,0j} = \sum_{i=1}^{n} \mu_{k+1}^{b,i|j} m_k^{b,i} \quad (45)$$

and $$P_k^{b,0j} = \sum_{i=1}^{n} \mu_{k+1}^{b,i|j} [\hat{P}_k^{b,i} + (\hat{m}_k^{m,i} - \hat{m}_k^{b,0j})(\hat{m}_k^{m,i} - \hat{m}_k^{b,0j})^T]. \quad (46)$$

The example Kalman filter 412 of FIG. 4 computes the mean $m_k^{b,j}$ and covariance $P_k^{b,j}$ of the example updated backward-time filter density $p(s_k^j|z_{k:N})$ as follows $$[m_k^{b,j}, P_k^{b,j}] = KF_u(\hat{m}_k^{b,0j}, \hat{P}_k^{b,0j}, z_k, H_k^j, R_k^j). \quad (47)$$

Example measurement likelihoods for each model may be computed as $$\Lambda_k^{b,i} = \mathcal{N}(v_k^{b,i}; 0, S_k^{b,i}), \quad (48)$$

where $v_k^{b,i}$ represents the measurement residual and $S_k^{b,i}$ represents the innovation covariance for model $M^i$ in the Kalman filter update.

The example motion tracker 410 of FIG. 4 updates the model probabilities $\mu_k^{b,j}$ at time step k using the following mathematical expression $$\mu_k^{b,j} = \frac{1}{a} a_j \Lambda_k^{b,j}, \quad (49)$$

where an example normalizing constant a is given by $$a = \sum_{j=1}^{m} a_j \Lambda_k^{b,j} \quad (49)$$

An example Gaussian approximation of the updated backward-time filter is given by $$p(b f s_k|z_{k:N}) = \mathcal{N}(x_k|m_k^b, P_k^b) \quad (51)$$

where $$m_k^b = \sum_{j=1}^{n} \mu_k^{b,j} m_k^{b,j} \quad (52)$$

and $$P_k^b = \sum_{j=1}^{n} \mu_k^{b,j} [P_k^{b,j} + (m_k^{b,j} - m_k^b)(m_k^{b,j} - m_k^b)^T]. \quad (53)$$

The example motion tracker 410 of FIG. 4 identifies and/or determines an estimate for $s_k$ at time-step k using measurements from 1 to N, where N>k. An example smoothing density can be expressed as $$p(s_k|z_{1:N}) = \sum_{j=1}^{n} \mu_k^{s,j} p(s_k^j|z_{1:N}), \tag{54}$$

where example model probabilities are computed as $$\mu_k^{s,j} = P\{M_k^j|z_{1:N}\} = \frac{d_j \mu_k^k}{\sum_{j=1}^{n} d_j \mu_k^k} \text{ and} \tag{55}$$

$$d_j = p(z_{k+1:N}|M_k^j, z_{1:k}). \tag{56}$$

Example model-conditioned smoothing distributions $p(s_k^j|z_{1:N})$ are expressed as mixture of the Gaussian distributions $$p(s_k^j|z_{1:N}) = \sum_{j=1}^{n} \mu_{k+1}^{s,i|j} p(s^i|M_{k+1}^j, z_{1:N}), \tag{57}$$

where an example conditional probability is given by $$\mu_{k+1}^{s,i|j} = P\{M_{k+1}^i|M_k^j, z_{1:N}\} = \frac{1}{d_j} p_{ij} \Lambda_k^{ij} \tag{58}$$

and the likelihood $\Lambda_k^{ij}$ is defined as $$\Lambda_k^{ij} = p(z_{k+1:N}|M_k^j, M_{k+1}^i, z_{1:k}) \approx p(s_k^{b,i}|M_k^j, M_{k+1}^i, s_k^j).$$

The example motion tracker 410 of FIG. 4 replaces future measurements $y_{k+1:N}$ with n model-conditioned backward-time predicted means and covariances $\{\hat{m}_k^{b,i}, \hat{P}_k^{b,i}\}$, and replaces $y_{1:k}$ with an n model-conditioned forward-time filtered means and covariances $\{\hat{m}_k^i, \hat{P}_k^i\}$. Example likelihoods can be computed as $$\Lambda_k^{ij} = \mathcal{N}(\hat{m}_k^{b,i} - m_k^j|0, \hat{P}_k^{b,i} + P_k^j). \tag{59}$$

The example terms $d_j$ of (56) can be computed as $$d_j = \sum_{i=1}^{n} p_{ji} \Lambda_k^{ij} \tag{60}$$

An example smoothing distribution of the states matched to $M_k^j$ and $M_{k+1}^i$ over two successive sampling periods can be expressed as $$p(s_k^j|M_{k+1}^i, z_{1:N}) = \frac{1}{c} p(z_{k+1:N}|M_{k+1}^i, s_k) p(s_k^j|z_{1:k}), \tag{61}$$

where $p(z_{k+1:N}|M_{k+1}^i, s_k)$ is the forward-time model-conditioned distribution, $p(s_k^j|z_{1:k})$ is the backward-time one-step predictive distribution, and c comprises a normalizing constant. Thus, another example smoothing distribution can be expressed as $$p(s_k^j|M_{k+1}^i, z_{1:N}) \propto \mathcal{N}(s_k|\hat{m}_k^{b,i}, \hat{P}_k^{b,i}) \mathcal{N}(s_k|m_k^j, P_k^j) = \mathcal{N}(s_k|m_k^{s,ji}, P_k^{s,ji}) \tag{62}$$

where $$m_k^{s,ji} = P_k^{s,ji}[(P_k^j)^{-1} m_k^j + (\hat{P}_k^{b,i})^{-1} \hat{m}_k^{b,i}] \tag{63}$$

$$P_k^{s,ji} = [(P_k^j)^{-1} + (\hat{P}_k^{b,i})^{-1}]^{-1} \tag{64}$$

The example model-conditioned smoothing distributions may be approximated by a single Gaussian distribution via moment matching to yield $$p(s_k^j|z_{1:N}) \approx \mathcal{N}(s_k^j|m_k^{s,j}, P_k^{s,j}) \tag{65}$$

where $$m_k^{s,j} = \sum_{i=1}^{n} \mu_{k+1}^{s,i|j} m_k^{s,ji} \tag{66}$$

$$P_k^{s,j} = \sum_{i=1}^{n} \mu_{k+1}^{s,i|j} [P_k^{s,ji} + (m_k^{s,ji} - m_k^{s,j})(m_k^{s,ji} - m_k^{s,j})^T] \tag{67}$$

The moments of the example overall smoothing distribution can be matched to approximate it as a single Gaussian distribution $$p(s_k|y_{1:N}) \approx \mathcal{N}(s_k|m_k^s, P_k^s), \tag{68}$$

where an example LV boundary motion prediction is expressed mathematically as $$m_k^s = \sum_{j=1}^{n} \mu_k^{s,j} m_k^{s,ji} \tag{69}$$

$$P_k^s = \sum_{j=1}^{n} \mu_k^{s,j} [P_k^{s,j} + (m_k^{s,j} - m_k^s)(m_k^{s,j} - m_k^s)^T]. \tag{70}$$

In some examples, the initial state vector $s_1$ may not be know a priori. In such examples, the example motion tracker 410 of FIG. 4 implements a two-point differencing method to initialize position and velocity components of the state vector s. For instance, the motion tracker 410 may compute the initial position and velocity elements in x-coordinate direction using the following equations $$\hat{x}_1 = z_{1,x}, \text{ and} \tag{71}$$

$$\hat{\dot{x}}_1 = \frac{(z_{2,x} - z_{1,x})}{T}. \tag{72}$$

The mean position $\bar{x}$ over the cardiac cycle or heartbeat may be computed by the example motion tracker 410 by taking an expectation over all corresponding measurements $$\bar{\hat{x}}_1 = \frac{1}{K} \sum_{k=1}^{K} z_{k,x} \tag{73}$$

The example motion tracker 410 likewise computes the initial state elements in y-coordinate direction, $\hat{y}_1$, $\hat{\dot{y}}_1$, and $\bar{y}_1$ using the measurements $\{Z_{k,y}\}$. The motion tracker 410 computes the corresponding initial covariance by computing the following mathematical expression $$p_1 = \begin{bmatrix} \Phi_1 & 0_{3\times 3} \\ 0_{3\times 3} & \Phi_1 \end{bmatrix} \quad (74)$$

where $$\Phi_1 = \begin{bmatrix} r & \frac{r}{K} & \frac{r}{KT} \\ \frac{r}{K} & r & \frac{r}{T} \\ \frac{r}{KT} & \frac{r}{T} & \frac{2r}{T^2} \end{bmatrix}. \quad (75)$$

To characterize the motion of the heart, the example image processing module 320 includes a classifier 415. Using any number and/or type(s) of method(s) and/or algorithm(s), the example classifier 415 of FIG. 4 processes the parameters representative of predicted and/or estimated endocardial motion computed by the example motion tracker 410 to identify heart motion abnormalities. In some examples, the classifier 415 computes, estimates and/or otherwise determines one or more information-theoretic measures or metrics representative of heart motion. Consistent with industry usage, the terms "information-theoretic metric" and "information-theoretic measures" used herein refer to any values that are computed based on one or more properties of information theory. As is well known, the field of information theory is based on probability theory and statistics, and is concerned with the quantification of information and/or the computation of measures of information. Example information-theoretic metrics are entropy, which is the information in a random variable, and mutual information, which represents the amount of information in common between two random variables. Additional example information-theoretic metrics include, but are not limited to, the Shannon differential entropy (SDE), which provides a global theoretical ground measure of distributions, the Renyi entropy, and/or Fisher information. Example methods, apparatus and articles of manufacture to compute information-theoretic metrics representative of heart motion are described in U.S. patent application Ser. No. 12/633,519, which was filed on Dec. 8, 2009, now U.S. Pat. No 8,478,012, and which is hereby incorporated by reference in its entirety. To classify heart as normal or abnormal, the example classifier 415 of FIG. 4 compares the computed information-theoretic metrics computed to one or more thresholds. Based on the comparison(s), the motion of the heart is classified as normal or abnormal. Results of the comparison(s), for example, whether the predicted and/or estimated endocardial motion is normal or abnormal, may be presented at the example display(s) and/or output device(s) 310.

While an example manner of implementing the example image processing module 320 of FIG. 3 is illustrated in FIG. 4, one or more of the interfaces, data structures, elements, processes and/or devices illustrated in FIG. 4 may be combined, divided, re-arranged, omitted, eliminated and/or implemented in any other way. Further, the example segmenter 405, the example motion tracker 410, the example IMM estimator 411, the example Kalman filter 412, the example classifier 415 and/or, more generally, the example image processing module 320 of FIG. 4 may be implemented by hardware, software, firmware and/or any combination of hardware, software and/or firmware. Thus, for example, any of the example segmenter 405, the example motion tracker 410, the example IMM estimator 411, the example Kalman filter 412, the example classifier 415 and/or, more generally, the example image processing module 320 may be implemented by one or more circuit(s), programmable processor(s), ASIC(s), PLD(s) and/or FPLD(s), etc. any apparatus claim of any patent resulting from this provisional application is read to cover a purely software and/or firmware implementation, at least one of the example segmenter 405, the example motion tracker 410, the example IMM estimator 411, the example Kalman filter 412, the example classifier 415 and/or, more generally, the example image processing module 320 are hereby expressly defined to include a tangible computer-readable medium such as a memory, a DVD, a CD, etc. storing the firmware and/or software. Further still, the example image processing module 320 may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
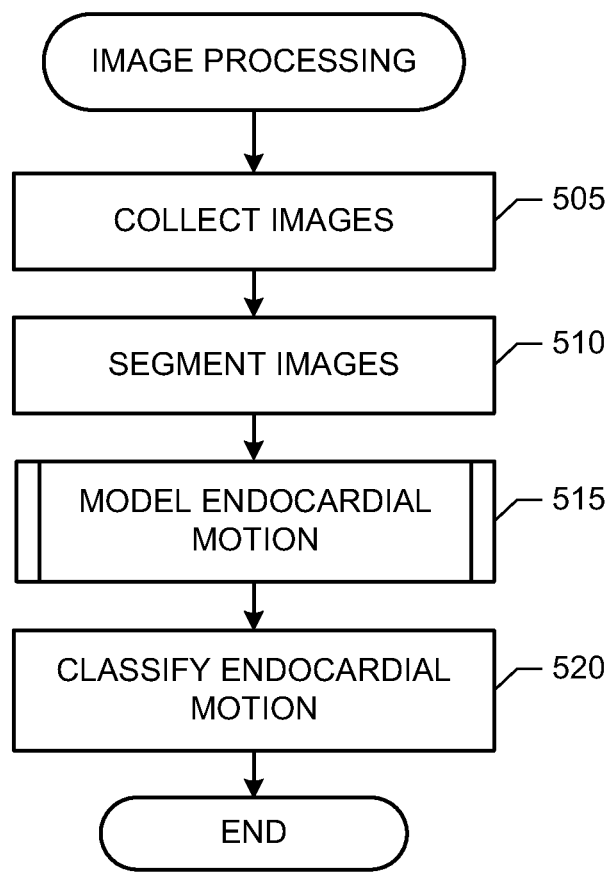
FIGS. 5-7 are flowcharts representative of example processes that may be carried out to implement the example diagnostic workstation of FIGS. 1 and 3.
Figure 6:
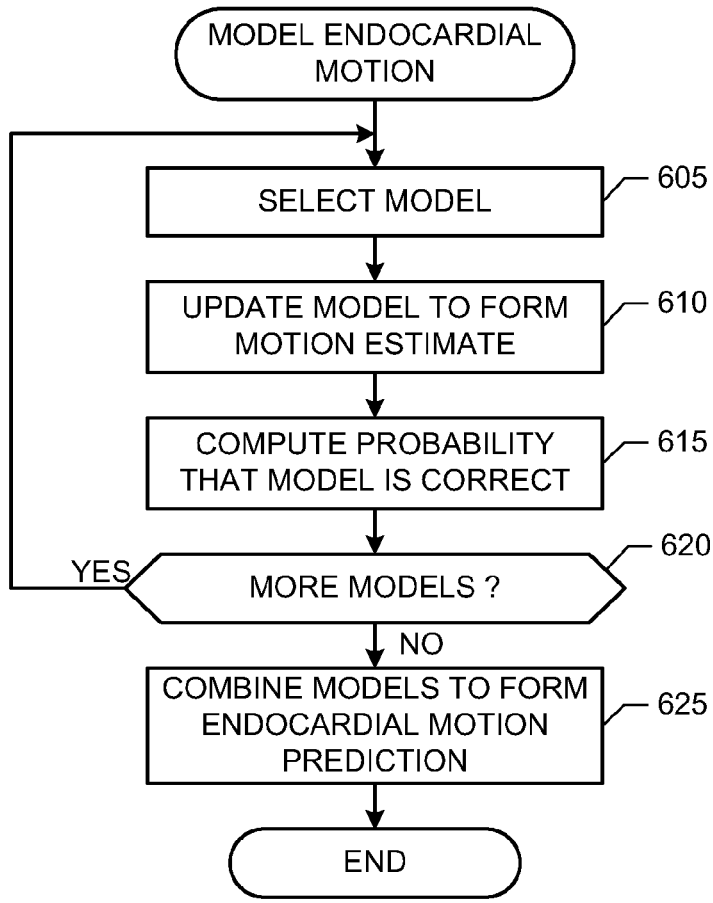
Figure 7:
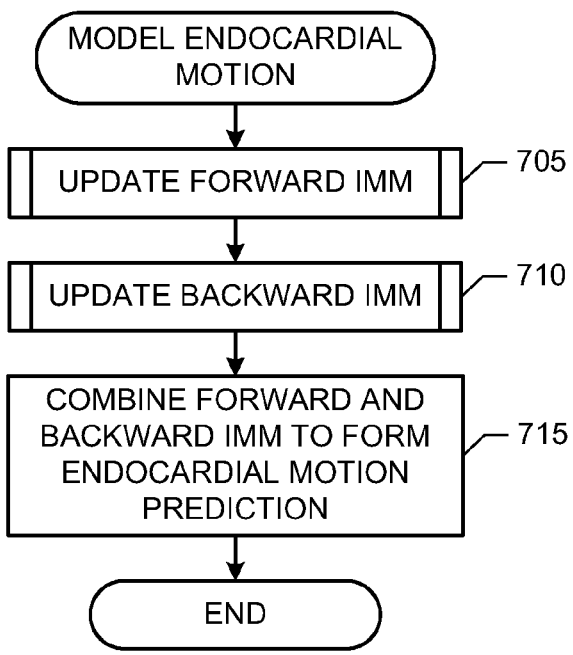

FIGS. 5-7 illustrates example processes that may be carried out to implement the example image processing module 320 and/or, more generally, the example diagnostic workstation 105 of FIGS. 1, 3 and 4. The example processes of FIGS. 5-7 may be carried out by a processor, a controller and/or any other suitable processing device. For example, the example processes of FIGS. 5-7 may be embodied in coded instructions stored on a tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of computer-executable instructions or data structures, and which can be accessed by a processor, a general purpose or special purpose computer or other machine with a processor (e.g., the example processor platform P100 discussed below in connection with FIG. 8). Combinations of the above are also included within the scope of computer-readable media. Computer-executable instructions comprise, for example, instructions and data that cause a processor, a general purpose computer, special purpose computer, or a special purpose processing machine to perform one or more particular processes. Alternatively, some or all of the example processes of FIGS. 5-7 may be implemented using any combination(s) of ASIC(s), PLD(s), FPLD(s), discrete logic, hardware, firmware, etc. Also, some or all of the example processes of FIGS. 5-7 may be implemented manually or as any combination of any of the foregoing techniques, for example, any combination of firmware, software, discrete logic and/or hardware. Further, many other methods of implementing the example operations of FIGS. 5-7 may be employed. For example, the order of execution of the blocks may be changed, and/or one or more of the blocks described may be changed, eliminated, sub-divided, or combined. Additionally, any or all of the example processes of FIGS. 5-7 may be carried out sequentially and/or carried out in parallel by, for example, separate processing threads, processors, devices, discrete logic, circuits, etc.

The example process of FIG. 5 begins with the example diagnostic imaging workstation 105 collecting a sequence of left-ventricle cardiac images from the example image manager 120 (block 505). The example segmenter 405 segments the images, as described above in connection with FIG. 4 (block 510). The example motion tracker 410, the example IMM estimator 411 and the example Kalman filter 412 generate a model representative of the motion of the segmented imaged left-ventricle images (block 515) by, for example, carrying out one or more of the example processes of FIGS. 6 and 7. Based on the motion predictions and/or estimations computed by the example motion tracker 410, the example IMM estimator 411 and the example Kalman filter 412, the example classifier 415 computes one or more information-theoretic metrics, such as the SDE, the Rényi entropy, and/or the Fisher information and determines whether the modeled motion of the imaged heart is normal or abnormal (block 520). Control then exits from the example process of FIG. 5.

The example process of FIG. 6 begins with the motion tracker 410 selecting one of a plurality of IMM models (block 605). The example Kalman filter 412 updates the selected model to form a motion or state estimate for the left ventricle (block 610). The example IMM estimator 411 computes, estimates and/or updates the probability that the motion or state estimate is correct (block 615).

If there are more models to process (block 620), control returns to block 605 to select the next IMM model. If there are no more models to process (block 620), the example motion tracker 410 computes overall motion and/or state estimate for the left ventricle as a weighted sum of the individual motion or state estimates based on the computed probabilities (block 625). Control then exits from the example process of FIG. 6.

The example process of FIG. 7 begins with the example motion tracker 410, the example IMM estimator 411 and the example Kalman filter 412 updating a forward IMM prediction by, for example, carrying out the example process of FIG. 6 (block 705). The example motion tracker 410, the example IMM estimator 411 and the example Kalman filter 412 update a backward IMM prediction by, for example, carrying out the example process of FIG. 6 (block 710). Left ventricle motion and/or state estimates from the updated forward and backward IMM predictions are combined as, for example, described above in connection with FIG. 4 (block 715). Control then exits from the example process of FIG. 7.

Figure 8:
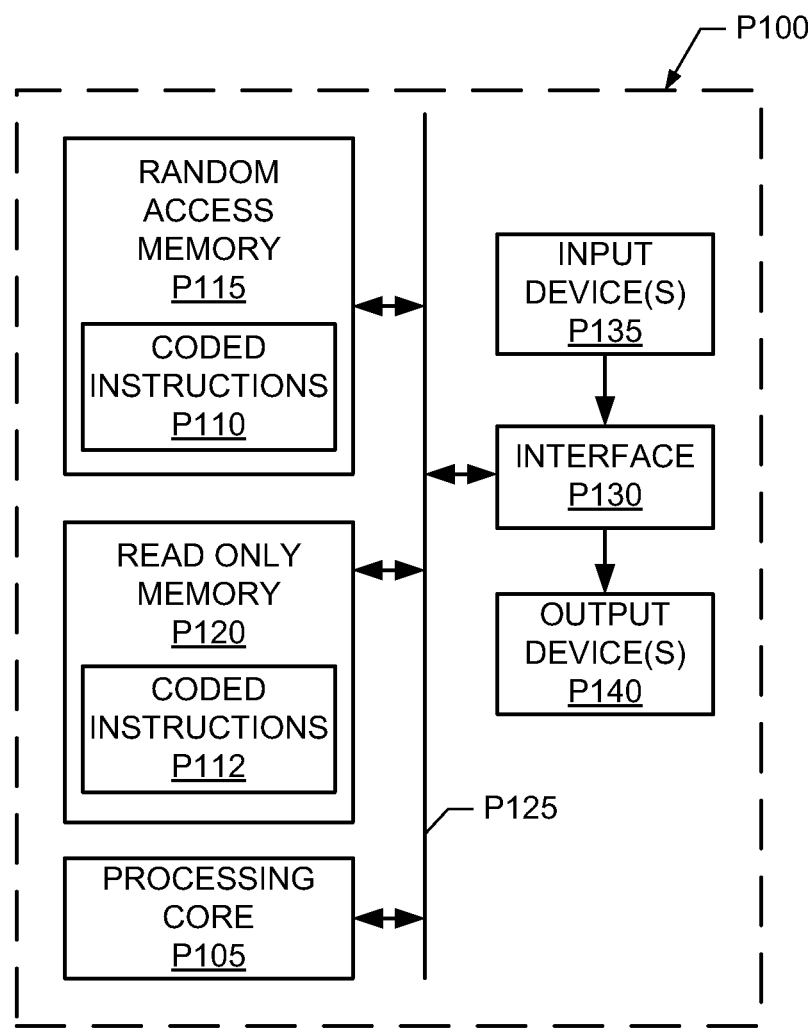
FIG. 8 is a schematic illustration of an example processor platform that may be used and/or programmed to carry out the example processes of FIG. 5-7 and/or to implement any or all of the example methods, apparatus and articles of manufacture described herein.

FIG. 8 is a schematic diagram of an example processor platform P100 that may be used and/or programmed to implement any or all of the example diagnostic imaging workstation 105, the example image processing module 320, the example segmenter 405, the example motion tracker 410, the example IMM estimator 411, the example Kalman filter 412, and/or the example classifier 415, of FIGS. 1, 3 and 4. For example, the processor platform P100 can be implemented by one or more general-purpose processors, processor cores, microcontrollers, etc.

The example processor platform P100 of FIG. 8 includes at least one programmable processing core P105. The example processing core P105 executes coded and/or machine-accessible instructions P110 and/or P112 stored in the memory space of the processing core P105 (e.g., within a RAM P115 and/or a ROM P120). The example processing core P105 may be any type of processing unit, such as a processor core, a processor and/or a microcontroller. The processing core P105 may execute, among other things, the example processes of FIGS. 5-7, and/or to implement any of the example methods, apparatus and articles of manufacture disclosed herein.

The example processing core P105 is in communication with the memory (including the ROM P120 and/or the RAM P115) via a bus P125. The RAM P115 may be implemented by dynamic random-access memory (DRAM), synchronous dynamic random-access memory (SDRAM), and/or any other type of RAM device, and the ROM P120 may be implemented by flash memory(-ies) and/or any other type of memory(-ies) and/or memory device(s). Access to the memories P115 and P120 may be controlled by a memory controller (not shown). The example memories P115 and/or P120 may be used to implement the example image database 115.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example image acquisition system(s) 110.

Generally, computer-executable instructions include routines, programs, objects, components, data structures, etc., that perform particular tasks or implement particular abstract data types. Computer-executable instructions, associated data structures, and program modules represent examples of program code for executing the processes to implement the example methods and systems disclosed herein. The particular sequence of such executable instructions and/or associated data structures represent examples of corresponding acts for implementing the examples described herein.

The example methods and apparatus described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Such network computing environments may encompass many types of computer system configurations, including personal computers, hand-held devices, multi-processor systems, microprocessor-based or programmable consumer electronics, network PCs, minicomputers, mainframe computers, and the like. The example methods and apparatus described herein may, additionally or alternatively, be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    segmenting a plurality of cardiac images of a left ventricle to form respective ones of a plurality of segmented images;
    updating a plurality of models based on the plurality of segmented images to form respective ones of a plurality of motion estimates for the left ventricle;
    computing a plurality of probabilities for respective ones of the plurality of models; and
    computing a weighted sum of the plurality of motion estimates based on the plurality of probabilities, the weighted sum representing a predicted motion of the left ventricle.

2. A method as defined in claim 1, wherein updating one of the plurality of models comprises updating a Kalman filter.

3. A method as defined in claim 1, further comprising:
updating a second plurality of models based on the plurality of segmented images to form respective ones of a second plurality of motion estimates for the left ventricle;
computing a second plurality of probabilities for respective ones of the second plurality of models; and
computing a second weighted sum of the second plurality of motion estimates based on the second plurality of probabilities, the second weighted sum representing a second predicted motion of the left ventricle.

4. A method as defined in claim 3, further comprising combining the first and second weighted sums to form a third predicted motion of the left ventricle.

5. A method as defined in claim 1, wherein a first of the plurality of models represents a forward interacting multiple model (IMM) estimator, and a second of the plurality of models represents a backward IMM estimator.

6. A method as defined in claim 1, further comprising computing the plurality of probabilities to apply a smoothing filter to the predicted motion.

7. A method as defined in claim 1, further comprising:
determining whether the predicted motion of the left ventricle is abnormal based on the weighted sum; and
presenting a result of the determination to a user for use in diagnosis a patient associated with the left ventricle.

8. An article of manufacture storing machine-readable instructions that, when executed, cause a machine to:
segment a plurality of cardiac images of a left ventricle to form respective ones of a plurality of segmented images;
update a plurality of models based on the plurality of segmented images to form respective ones of a plurality of motion estimates for the left ventricle;
compute a plurality of probabilities for respective ones of the plurality of models; and
compute a weighted sum of the plurality of motion estimates based on the plurality of probabilities, the weighted sum representing a predicted motion of the left ventricle.

9. An article of manufacture as defined in claim 8, wherein the machine-readable instructions, when executed, cause the machine to update a Kalman filter to update a first of the plurality of models.

10. An article of manufacture as defined in claim 8, wherein the machine-readable instructions, when executed, cause the machine to:
update a second plurality of models based on the plurality of segmented images to form respective ones of a second plurality of motion estimates for the left ventricle;
compute a second plurality of probabilities for respective ones of the second plurality of models; and
compute a second weighted sum of the second plurality of motion estimates based on the second plurality of probabilities, the second weighted sum representing a second predicted motion of the left ventricle.

11. An article of manufacture as defined in claim 10, wherein the machine-readable instructions, when executed, cause the machine to combine the first and second weighted sums to form a third predicted motion of the left ventricle.

12. An article of manufacture as defined in claim 8, wherein a first of the plurality of models represents a forward interacting multiple model (IMM) estimator, and a second of the plurality of models represents a backward IMM estimator.

13. An article of manufacture as defined in claim 8, wherein the machine-readable instructions, when executed, cause the machine to:
determine whether the predicted motion of the left ventricle is abnormal based on the weighted sum; and
present a result of the determination to a user for use in diagnosis a patient associated with the left ventricle.

14. An apparatus comprising:
a segmenter to segment a plurality of cardiac images of a left ventricle to form respective ones of a plurality of segmented images;
a Kalman filter to update a plurality of models based on the plurality of segmented images to form respective ones of a plurality of motion estimates for the left ventricle;
an interacting multiple model (IMM) estimator to compute a plurality of probabilities for respective ones of the plurality of models; and
a motion tracker to compute a weighted sum of the plurality of motion estimates based on the plurality of probabilities, the weighted sum representing a predicted motion of the left ventricle, wherein at least one of the segmenter, the Kalman filter, the IMM estimator or the motion tracker is implemented via a processor.

15. An apparatus as defined in claim 14, further comprising a second IMM estimator to compute a second plurality of probabilities for respective ones of a second plurality of models, wherein the motion tracker is to combine outputs of the first and second plurality of models based on the first and second plurality of probabilities to compute the predicted motion of the left ventricle.

16. An apparatus as defined in claim 14, further comprising:
a classifier to determine whether a motion of the left ventricle is abnormal based on the weighted sum; and
an output device to present a result of the determination to a user for use in diagnosis a patient associated with the left ventricle.

17. An apparatus as defined in claim 14, wherein the motion tracker is to compute the plurality of probabilities to apply a smoothing filter to the predicted motion for the left ventricle.

* * * * *